United States Patent [19]

Sigai

[11] Patent Number: 4,585,673
[45] Date of Patent: Apr. 29, 1986

[54] METHOD FOR COATING PHOSPHOR PARTICLES

[75] Inventor: A. Gary Sigai, Lexington, Mass.

[73] Assignee: GTE Laboratories Incorporated, Waltham, Mass.

[21] Appl. No.: 718,096

[22] Filed: Apr. 3, 1985

Related U.S. Application Data

[63] Continuation-in-part of Ser. No. 607,846, May 7, 1984, abandoned.

[51] Int. Cl.[4] .......................... B05D 5/06; B05D 5/12; B05D 7/00; C23C 16/00
[52] U.S. Cl. ...................................... 427/213; 427/68; 427/70; 427/215; 427/255.2
[58] Field of Search ................. 427/64, 68, 215, 255.2, 427/213, 70; 428/403, 404

[56] References Cited

U.S. PATENT DOCUMENTS

| | | | |
|---|---|---|---|
| 2,151,496 | 3/1939 | Beese | 176/122 |
| 2,586,304 | 2/1952 | Coltman | 250/488.1 X |
| 2,817,599 | 12/1957 | Edwards et al. | 117/33.5 |
| 2,878,137 | 3/1959 | Butler et al. | 117/17 |
| 2,920,003 | 1/1960 | Davis | 117/33.5 |
| 2,971,859 | 2/1961 | Sisneros et al. | 428/403 X |
| 3,251,337 | 5/1966 | Latta et al. | 118/48 |
| 3,408,223 | 10/1968 | Shortes | 117/100 |
| 3,549,412 | 12/1970 | Frey et al. | 117/100 |
| 3,875,449 | 4/1975 | Byler et al. | 313/466 |
| 3,923,682 | 12/1975 | Dale et al. | 252/301.6 P |
| 3,963,639 | 6/1976 | Klein | 427/67 X |
| 3,984,587 | 10/1976 | Lipp | 427/70 |
| 4,243,909 | 1/1981 | Brecher et al. | 313/487 |
| 4,287,229 | 9/1981 | Watanabe et al. | 427/64 |
| 4,339,501 | 7/1982 | Inoue et al. | 428/404 |
| 4,440,800 | 4/1984 | Morton et al. | 427/13 |
| 4,459,507 | 7/1984 | Flaherty | 313/489 |
| 4,473,634 | 9/1984 | Dodds et al. | 430/272 |
| 4,515,827 | 5/1985 | Dodds et al. | 427/68 |

FOREIGN PATENT DOCUMENTS

| | | |
|---|---|---|
| 50-98057 | 8/1975 | Japan . |
| 50-98063 | 8/1975 | Japan . |
| 50-98065 | 8/1975 | Japan . |
| 1343250 | 1/1974 | United Kingdom . |

OTHER PUBLICATIONS

Duffy, M. T. et al, *Chemical Vapor Deposition of Aluminum Oxide Films from Organo-Aluminum Compounds*, RCA Review, Dec. 1970.
Mezentsera, I. A., *Study of an Increase in the Stability of Halophosphate Luminophors by the Application of Protective Coatings*, Soviet Union, 1980.
Lehmann, W., *An Analysis of Color-Changing Penetration-Type Cathode-Luminescent Phosphor Screens*, J. Electrochem. Soc: Solid State Science and Technology, 128(8): 1787(1981).
*Technical Bulletin Pigments*, Lovezzola-Ward Co., Inc., No. 56, pp. 1–5.
Frantz, Joseph F., *Design for Fluidization*, pp. 89–93, Chemical Engineering, Oct. 1, 1962.
Kirk-Othmer, Second Edition, Encyclopedia of Chemical Technology, vol. 9, 1966, pp. 398–405.
Geldart, D., *Types of Gas Fluidization*, Nov. 1, 1972, pp. E19-E26.
Geldart, Dr. Derek, *Gas Fluidization*, Oct. 29–Nov. 1, 1984, 5 pages.

Primary Examiner—Michael R. Lusignan
Attorney, Agent, or Firm—Martha Ann Finnegan; David M. Keay

[57] ABSTRACT

Disclosed is a method for applying a continuous protective coating to the surface of individual phosphor particles. The method involves chemical vapor deposition of the protective coating on individual particles of a phosphor powder while the phosphor particles are suspended in a fluidized bed. During the method, the fluidized particles are exposed to the vaporized coating precursor material at a first temperature, which is less than the decomposition temperature of the precursor material, and the precursor material is reacted to form the desired coating material at a second temperature, which is greater than or equal to the temperature at which the precursor material reacts to form the coating material.

28 Claims, 1 Drawing Figure

METHOD FOR COATING PHOSPHOR PARTICLES

CROSS-REFERENCE TO RELATED APPLICATION

This application is a continuation-in-part of application Ser. No. 607,846, filed on 7 May 1984, now abandoned.

BACKGROUND OF THE INVENTION

This invention relates to phosphors. More particularly, this invention is concerned with a method for applying a coating to the outer surface of individual phosphor particles.

Phosphors are used in mercury vapor discharge lamps and viewing screens of various electronic devices. It has been recognized that various improvements in the performance of phosphors can be obtained if the phosphor material is coated with a protective film or pigment. Numerous attempts have been made to coat the outer surface of individual phosphor particles with a protective coating. Such coatings having been applied, for example, by using selective additions to a lamp coating suspension; or by suspending particles of the phosphor in a solution containing the coating material and evaporating the solvent to form coated phosphor particles.

Disadvantages associated with these known methods are eliminated by the method of the present invention by which a continuous coating having a desired substantially uniform thickness is formed on the outer surface of the phosphor particles. In a preferred embodiment, the coating is formed by a gas-phase chemical vapor deposition of the coating material on the phosphor particles while the particles are suspended in a fluidized bed which is maintained in a temperature gradient.

SUMMARY OF THE INVENTION

According to this invention, there is provided a method for applying a continuous protective coating to individual phosphor particles which comprises depositing a continuous protective coating on individual phosphor particles by gas-phase chemical vapor deposition while said individual phosphor particles are suspended in a fluidized bed. The fluidized particles are exposed to a vaporized precursor material at a first temperature, the first temperature being less than the temperature at which the precursor material decomposes. After the particles have been enveloped by the precursor material, the precursor material is reacted to form a continuous protective coating on the surface of the individual particles at a second temperature, the second temperature being greater than or equal to the temperature at which the precursor material reacts to form the protective coating material.

In a preferred embodiment of the present invention, there is provided a method for forming a protective coating on phosphor particles which comprises vaporizing a volatilizable coating precursor material into an inert carrier gas; passing the vapor-containing carrier gas through a phosphor powder to form a fluidized bed and to coat particles of the phosphor powder with vapor of the coating precursor material contained in the carrier gas. The fluidized bed is maintained in a temperature gradient ranging from a lowest temperature to a highest temperature, the lowest temperature being less than the decomposition temperature of the coating precursor material and the highest temperature being at least a temperature sufficient to react the coating precursor material with an oxidizing gas to form the desired coating material. An oxidizing gas is passed into the fluidized bed separately from the vapor-containing gas, the oxidizing gas being introduced to react with the coating precursor material enveloping the particles of the phosphor powder to form the desired coating material. The foregoing steps are continued for a period of time sufficient to form a continuous coating of predetermined thickness on the outer surface of the phosphor particles.

In accordance with a second preferred embodiment of the present invention, there is provided a method for forming a protective coating on phosphor particles which comprises vaporizing a volatilizable oxygen-containing coating precursor material into an inert carrier gas; passing the vapor-containing carrier gas through particulate phosphor powder to form a fluidized bed and to coat particles of the phosphor powder with vapor of the oxygen-containing coating precursor material contained in the carrier gas, the fluidized bed being formed and maintained in a temperature gradient ranging from a lowest temperature to a highest temperature, the lowest temperature being less than the decomposition temperature of the oxygen-containing coating precursor material and the highest temperature being at least a temperature sufficient to react the coating precursor material to form a continuous coating of the desired coating material of predetermined thickness on the phosphor particles.

Figure 1:
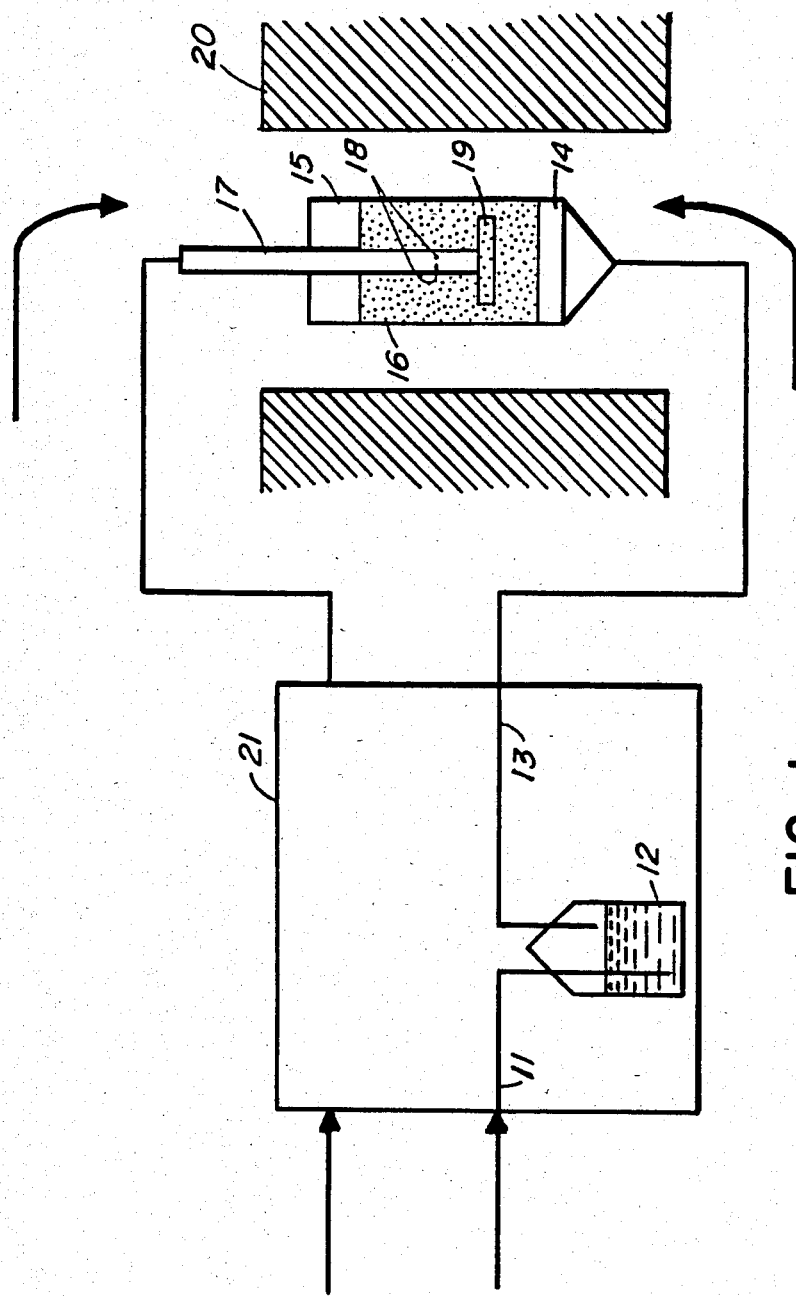
FIG. 1 is a schematic representation of an apparatus suitable for use in the method of the present invention.

For a better understanding of the present invention, together with other and further objects, advantages and capabilities thereof, reference is made to the following disclosure and appended claims in connection with the above described drawing.

DETAILED DESCRIPTION

The method of the present invention involves the formation of a continuous protective coating on phosphor particles by gas-phase chemical vapor deposition while the phosphor particles are suspended within a fluidized bed. The fluidized particles are exposed to a vaporized precursor material at a first temperature, the first temperature being less than the temperature at which the precursor material decomposes. After the particles have been enveloped by the precursor material, the precursor material is reacted to form a continuous protective coating on the surface of the individual particles at a second temperature, the second temperature being greater than or equal to the temperature at which the precursor material reacts to form the protective coating material.

The fluidized bed is formed by passing an inert gas upwardly through the phosphor particles in order to suspend the particles in the inert gas stream. Examples of inert gases suitable for use in this method include nitrogen, argon, helium, neon, or mixtures thereof. In addition to supporting the phosphor particles in a fluidized bed, the inert gas functions as a carrier gas. A volatilizable coating precursor material is vaporized into the inert gas before the inert gas enters the reaction chamber in which the phosphor particles become suspended. Preferably the carrier gas is saturated with the vapor of the coating precursor material. As the carrier gas containing the vaporized coating precursor material passes upwardly through the phosphor particles to suspend the particles in a fluidized bed, the particles are enveloped by the vapor of the coating precursor material which is contained in the carrier gas.

In the present method, the fluidized particles are exposed to the vaporized coating precursor material at a first temperature to envelop the particles with coating precursor material, the first temperature being less than the temperature at which the coating precursor material decomposes; and then reacting the coating precursor material enveloping the fluidized particles at a second temperature to form a continuous protective coating of predetermined thickness on the surface of individual phosphor particles, the second temperature being greater than or equal to the temperature at which the coating precursor material reacts to form the protective coating.

The fluidized bed is preferably maintained in a temperature gradient ranging from a lowest temperature to a highest temperature. The lowest temperature should be less than the temperature at which the coating precursor material will decompose, while the highest temperature should be equal to or greater than the temperature at which the coating precursor material reacts to form the desired coating material.

An oxidizing gas, if necessary, is introduced into the fluidized bed separately from the carrier gas containing the vaporized coating precursor material. Examples of suitable oxidizing gases are air or oxygen. The oxidizing gas may be mixed with a diluent inert gas.

The thickness of the coating is dependent upon the amount of time the process is run, the temperature of the evaporation source, the flow rate through the evaporation source, and the surface area of the phosphor.

Examples of phosphor coating materials that can be applied by the present method include metal or nonmetal oxides. Preferred coating materials are the refractory oxides, such as aluminum oxide or yttrium oxide. For a chemical compound or chemical composition to be suitable for use as coating precursor material in the method of the present invention, the compound or composition must be volatilizable. Organo and alkoxide compounds of the metal or nonmetal of the desired oxide coating material which are volatilizable under the conditions of the method may be used as coating precursor materials in the present invention. Acetylacetonates of the metal of the desired oxide coating material can also be used as precursor materials in the present method.

For example, some suitable aluminum oxide precursor materials are represented by the general formula ti $R_x(OR')_{3-x}Al$ wherein $0 \leq x \leq 3$ and x is an integer, and R and R' are lower alkyl groups, such as: —$CH_3$; —$C_2H_5$; —$C_3H_7$; or —$C_4H_9$. Examples of suitable yttrium oxide precursor materials are represented by the general formula $R_x(OR')_{3-x}Y$ wherein $0 \leq x \leq 3$ and x is an integer, and R and R' are lower alkyl groups, such as —$CH_3$; —$C_2H_5$; —$C_3H_7$; —$C_4H_9$; or —$C_5H_{11}$.

This listing of examples of suitable coating precursor material for aluminum oxide or yttrium oxide coatings is not to be construed as necessarily limiting thereof. Any alkyl, alkoxy, or acetylacetonate compounds of aluminum or yttrium which can be vaporized into the inert carrier gas under the conditions of the method may be used as coating precursor material for aluminum oxide coatings or yttrium oxide coatings, respectively.

When an oxygen-containing coating precursor material, such as an alkoxide or acetylacetonate, is used in the method of the present invention, the use of an oxidizing gas is optional.

In order to implement the fluidized bed-chemical vapor deposition coating method of the present invention, the phosphor powder particles must be capable of being fluidized. Phosphor powders having an average particle size range of about 20 to 80 microns and larger can be fluidized with little or no difficulty. Difficulty is encountered, however, in attempting to fluidize fine phosphor powders, i.e., phosphor powders with particles having an average particle size of less than about 20 microns. The difficulty in fluidizing the particles of fine phosphor powder arises from interparticle adhesive forces which cause agglomeration and bridging between the agglomerates. Such agglomeration and bridging of agglomerates normally results in the formation of channels through the bed thereby causing the gas to pass through the channels without fluidizing the particles. Under these circumstances, there is little or no powder bed expansion.

Particles of fine phosphor powders, such as coolwhite halophosphate phosphors which fall within class "C" of the Geldart Classification Scale, can be fluidized and coated by the method of the present invention. To fluidize particles of a fine phosphor powder in the method of the present invention, a small amount, up to about 1 weight percent with respect to the phosphor, of a fluidizing aid should be mixed with the phosphor powder to form a uniform mixture. Preferably, an amount of fluidizing aid less than or equal to about 0.05 weight percent with respect to the phosphor is employed. Suitable fluidizing aids include small particle aluminum oxide, e.g., Aluminum Oxide C, or small particle silica. Fluidization of fine phosphor powders can alternatively be accomplished by additional agitation of the phosphor powder particles which are suspended in the stream of carrier gas. This additional agitation can be accomplished by various agitating means, such as a mechanical stirrer, and preferably a high speed vibromixer. In a preferred embodiment of the present invention, both the fluidizing aid and the additional agitation are used together in order to fluidize the phosphor powder and improve the expansion of the fluidized bed. A schematic representation of a fluidized bed reactor suitable for use in the method of the present invention is shown in FIG. 1.

In FIG. 1, a feeder line 11 carries the inert carrier gas into a stainless steel bubbler 12 which contains volatilizable coating precursor material, usually in the liquid state. In the bubbler 12, the coating precursor material is vaporized into the carrier gas. The carrier gas containing the precursor can be diluted to provide appropriate concentration of reactants. The carrier gas containing the vaporized coating precursor material is carried through a connector line 13 into the base of a quartz glass reaction tube 15. The carrier gas containing the coating precursor material passes through a quartz frit 14 within the tube 15 which is used to support the phosphor particle bed 16. Also within the tube 15 is a vibrating mixer 17. Circumferentially located on the shaft of the vibrating mixer 17 and near the vibrating disc 19 is a series of holes 18 through which the oxidizing gas with or without an inert diluent gas enters the reaction tube 15. The quartz glass reaction tube 15 is surrounded by a furnace 20.

The feeder line 11 which carries the inert gas into the bubbler 12 and the bubbler 12 which contains the volatilizable coating precursor material in liquid state are both heated to a temperature which facilitates vaporization of the precursor material into the inert carrier gas. The carrier line 13, which carries the vapor-containing gas stream to the quartz glass reaction tube 15, is heated to a higher temperature than that of line 11 and the bubbler 12 to maintain the precursor material in the vapor state as it is carried to the reaction tube 15 from the bubbler 12.

An important feature of the preferred embodiments of the present invention is the maintenance of the fluidized bed in a temperature gradient. The frit area of the reaction tube is heated to and maintained at a temperature which is less than the temperature at which the coating precursor material decomposes. This area of the reaction tube, which is located at the bottom of the fluidized bed, has the lowest temperature of the temperature gradient in which the fluidized bed is maintained.

By introducing the precursor material into the fluidized bed via a stream of inert carrier gas and by maintaining the frit area at a temperature less than the decomposition temperature of the precursor material (which is also less than the highest temperature of the temperature gradient), the outer surface of each phosphor particle in the fluidized bed is enveloped by vapor of the coating precursor material. Introducing the coating precursor material into the reaction tube via an inert carrier gas eliminates the problem of premature reaction of the precursor material to the desired coating material or to an undesired by-product. Premature reaction results in formation of the actual coating material or by-product in the carrier line 13 from the bubbler 12 to the reaction tube 15, below the frit, or in the porous openings of the frit 14 itself. Premature reaction can further result in blockage of the frit and interruption of the coating process. The problem of decomposition of the precursor material in the frit area is further avoided by maintaining the frit area at a temperature below the temperature at which the precursor material thermally decomposes. Decomposition of the precursor materials which do not contain oxygen, e.g., the alkyl compounds, results in body color being imparted to the coated phosphor and/or incorporation of carbon contaminants into the phosphor coating, which contaminants absorb exciting and/or emitting radiation of the phosphor.

In the method of this invention, an oxidizing gas, when necessary, is introduced into the fluidized bed separately from the carrier gas. The oxidizing gas may or may not be diluted with an inert gas. Preferably, the oxidizing gas is introduced into the fluidized bed at a temperature which is less than the highest temperature, but greater than the lowest temperature. Most preferably, the oxidizing gas is introduced into the fluidized bed at a point in the temperature gradient where the temperature is less than the temperature at which the coating precursor material will undergo a chemical change in the presence of an oxidizing gas. This minimizes contamination of the coating material with carbon and other carbon containing compounds.

The highest temperature of the temperature gradient must be sufficiently high for the coating precursor material surrounding the outer surface of the phosphor particles to react to form the desired coating material. By reacting the precursor material after the vapor of the precursor material has enveloped the phosphor particle surface, the coating is continuous, i.e., the coating does not consist of individual particles of a very fine powder but, rather, shows a high degree of conformal coating, replicating submicron features found naturally occurring on the phosphor grain substrates. The coating is noncrystalline.

The following is exemplary of preparations of coated phosphor powder particles according to the methods of the preferred embodiments of the present invention and is not to be construed as necessarily limiting thereof.

EXAMPLE I

In this example, particles of cool white alkaline earth halophosphate phosphor powder were coated with aluminum oxide by the method of the present invention, using the apparatus illustrated by FIG. 1. A fluidized bed 1⅝ inch (4.0 centimeter) I.D. was used for the method. Two hundred grams of calcium halophosphate phosphor powder (Cool White No. 4459, obtained from the Chemical and Metallurgical Division of GTE Products Corporation, Towanda, Pa.) and 0.1 g (0.05 weight percent) Aluminum Oxide C, available from Degussa, Inc., the fluidizing aid, were dry blended in a polyethylene jar to obtain a uniform dispersion of the Aluminum Oxide C fluidizing aid throughout the alkaline earth halophosphate powder. The mixture of the halophosphate phosphor powder and fluidizing aid was added to the quartz glass reaction tube 15 to form the phosphor bed. Liquid trimethyl aluminum was used in the stainless steel bubbler 12 as the coating precursor material. The carrier gas was bubbled into the trimethyl aluminum liquid to form carrier gas containing vaporized trimethyl aluminum. The carrier gas containing vaporized trimethyl aluminum was diluted with inert gas and then was transported via carrier line 13 to the quartz glass reaction tube 15. Oxygen gas diluted with nitrogen was transported into the fluidized bed through holes 18 circumferentially located on the shaft of the vibrating mixer 17 above the vibrating disc 19. The vibrating mixer was operated at a speed at 60 cycles/minute. Introducing the oxygen into the fluidized bed through an opening or openings located above the vibrating disc, which disc is sufficiently removed from the frit area to avoid the caking of solid material on the frit, eliminated reaction of the precursor material in the frit openings and prevented blockage of the frit openings.

The nitrogen gas line 11 leading into the bubbler 12 and the bubbler 12 were both heated to and maintained at a temperature of 30° C. Line 13 leading out of the bubbler 12 and into the bottom of the quartz glass reaction tube 15 was heated to an maintained at a temperature of about 45° C.

The furnace 20 was a resistance heated 3 zone furnace. The frit area was maintained at a temperature of from about 60° C. to about 150° C.; the oxidizing gas inlet area, located above the vibrating disc, was heated to and maintained at a temperature of about 400° C.; and the area above the oxidizing gas inlet area was heated to and maintained at a temperature of about 650° C., although any temperature of 450° C. or above can be used.

A nitrogen flow of about 100 cc/min was passed into the bubbler 12, and the nitrogen gas containing vaporized trimethyl aluminum (transporting about 700 mg/hr) passed through line 13 and into the reaction tube 15 at a flow rate of about 450 cc/min. The stream of oxygen gas diluted with nitrogen gas was passed into the reaction tube through a second carrier line 21 at a flow rate of about 450 cc/min. The concentration ratio of oxygen to alkyl was observed to affect the body color of the coated particle formed by the present method. A concentration ratio of $O_2$ to trimethyl aluminum of about 200 to 1 was maintained during this reaction to obtain a white body color. (A ratio of less than about 200 to 1 can result in poor, or non-white, body color.)

The process was continued for 6 hours and an aluminum oxide coating having a thickness of about 150 Angstroms was formed on the phosphor particles.

The aluminum oxide coated particles of the alkaline earth halophosphate were removed from the reaction tube.

Electron microscopy of the coated phosphor particles of this example indicated a smooth conformal coating of aluminum oxide on the cool white alkaline earth halophosphate phosphor particles. The continuous and conformal nature of the coating applied to the phosphor particle in the example is demonstrated by the replication of the submicron features of the phosphor substrate. The submicron features of the coated particle, however, are visibly less pronounced when compared to the submicron features of an uncoated particle. The coating was additionally shown to be noncrystalline by reflection electron diffraction techniques.

Auger analysis of the coated particle surface revealed that complete surface coverage, within the limits of analysis (99.8%), by aluminum oxide has been achieved, based on the attenuation of the calcium peak-to-peak height of the alkaline earth halophosphate phosphor using the formula:

$$\% \text{ coverage} = \left[ 1 - \left( \frac{I_{Ca,coated}}{I_{Ca,uncoated}} \right) \right] \times 100$$

EXAMPLE II

In this example, particles of cool white alkaline earth halophosphate phosphor powder were coated with aluminum oxide by the method of the present invention, using the apparatus described in Example I. Three hundred grams of calcium halophosphate phosphor powder (Cool White No. 4459, obtained from the Chemical and Metallurgical Division of GTE Products Corporation, Towanda, Pa.) and 0.15 g (0.05 weight percent) Aluminum Oxide C, available from Degussa, Inc., the fluidizing aid, were dry blended in a polyethylene jar to obtain a uniform dispersion of the Aluminum Oxide C fluidizing aid throughout the alkaline earth halophosphate powder. The mixture of the halophosphate phosphor powder and fluidizing aid was added to the quartz glass reaction tube to form the phosphor bed. Liquid trimethyl aluminum was used in the stainless steel bubbler as the coating precursor material. The carrier gas was bubbled into the trimethyl aluminum liquid to form carrier gas containing vaporized trimethyl aluminum. The carrier gas containing vaporized trimethyl aluminum was transported via a carrier line to the quartz glass reaction tube. Oxygen gas diluted with nitrogen was transported into the fluidized bed through the holes located on the shaft of the vibrating mixer. The vibrating mixer was operated at a speed at 60 cycles/minute.

The bubbler and the nitrogen gas line leading into the bubbler were both heated to and maintained at a temperature of 30° C. The line leading out of the bubbler and into the bottom of the quartz glass reaction tube was heated to and maintained at a temperature of about 45° C.

The frit area of the reaction tube was maintained at a temperature of from about 60° C. to about 150° C.; the oxidizing gas inlet area, located above the vibrating disc, was heated to an maintained at a temperature of about 400° C.; and the area above the oxidizing gas inlet area was heated to and maintained at a temperature of about 550° C.

A nitrogen flow of about 100 cc/min was passed into the bubbler, and the nitrogen gas containing vaporized trimethyl aluminum was transported by nitrogen carrier gas into the reaction tube at a flow rate of about 550 cc/min. The stream of oxygen gas diluted with nitrogen gas was passed into the reaction tube through the second carrier line. The flow rate of the oxygen was 495 cc/min and that of the nitrogen diluent was about 50 cc/min. A concentration ratio of $O_2$ to trimethyl aluminum of about 200 to 1 was maintained during this reaction to obtain a white body color.

The process was continued for 6 hours and an aluminum oxide coating having a thickness of about 100 Angstroms was formed on the phosphor particles.

Electron microscopy of the coated phosphor particles of this example indicated a smooth conformal coating of aluminum oxide on the cool white alkaline earth halophosphate phosphor particles. The continuous and conformal nature of the coating applied to the phosphor particle in the example was demonstrated by the replication of the submicron features of the phosphor substrate. The submicron features of the coated particle, however, are visibly less pronounced when compared to the submicron features of an uncoated particle.

EXAMPLE III

In this example, particles of cool white alkaline earth halophosphate phosphor powder were coated with aluminum oxide by the method of the present invention, using the apparatus described in Example I. Three hundred grams of calcium halophosphate phosphor powder (Cool White No. 4459, obtained from the Chemical and Metallurgical Division of GTE Products Corporation, Towanda, Pa.) and 0.15 g (0.05 weight percent) Aluminum Oxide C, available from Degussa, Inc., the fluidizing aid, were dry blended in a polyethylene jar to obtain a uniform dispersion of the Aluminum Oxide C fluidizing aid throughout the alkaline earth halophosphate powder. The mixture of the halophosphate phosphor powder and fluidizing aid was added to the quartz glass reaction tube to form the phosphor bed. Liquid trimethyl aluminum was used in the stainless steel bubbler as the coating precursor material. The carrier gas was bubbled into the trimethyl aluminum liquid to form carrier gas containing vaporized trimethyl aluminum. The carrier gas containing vaporized trimethyl aluminum was transported via the carrier line to the quartz glass reaction tube. Oxygen gas diluted with nitrogen was transported into the fluidized bed through the holes located on the shaft of the vibrating mixer. The vibrating mixer was operated at a speed at 60 cycles/minute.

The bubbler and the nitrogen gas line leading into the bubbler were both heated to and maintained at a temperature of 30° C. The line leading out of the bubbler and into the bottom of the quartz glass reaction tube was heated to an maintained at a temperature of about 45° C.

The frit area of the reaction tube was maintained at a temperature of from about 60° C. to about 150° C.; the oxidizing gas inlet area, located above the vibrating disc, was heated to and maintained at a temperature of about 400° C.; and the area above the oxidizing gas inlet area was heated to and maintained at a temperature of about 550° C.

A nitrogen flow of about 150 cc/min was passed into the bubbler, and the nitrogen gas containing vaporized trimethyl aluminum was transported by nitrogen carrier gas into the reaction tube at a flow rate of about 500 cc/min. The stream of oxygen gas diluted with nitrogen gas was passed into the reaction tube through the second carrier line. The flow rate of oxygen was about 495 cc/min and that of the nitrogen diluent was about 50 cc/min. A concentration ratio of $O_2$ to trimethyl aluminum of about 200 to 1 was maintained during this reaction to obtain a white body color.

The process was continued for 4 hours and an aluminum oxide coating having a thickness of about 100 Angstroms was formed on the phosphor particles.

Electron microscopy of the coated phosphor particles of this example indicated a smooth conformal coating of aluminum oxide on the cool white alkaline earth halophosphate phosphor particles. The continuous and conformal nature of the coating applied to the phosphor particle in the example was demonstrated by the replication of the submicron features of the phosphor substrate. The submicron features of the coated particle, however, are visibly less pronounced when compared to the submicron features of an uncoated particle.

EXAMPLE IV

In this example, particles of cool white alkaline earth halophosphate phosphor powder were coated with aluminum oxide by the method of the present invention, using the apparatus described in Example I. Three hundred grams of calcium halophosphate phosphor powder (Cool White No. 4459, obtained from the Chemical and Metallurgical Division of GTE Products Corporation, Towanda, Pa.) and 0.15 g (0.05 weight percent) Aluminum Oxide C, available from Degussa, Inc., the fluidizing aid, were dry blended in a polyethylene jar to obtain a uniform dispersion of the Aluminum Oxide C fluidizing aid throughout the alkaline earth halophosphate powder. The mixture of the halophosphate phosphor powder and fluidizing aid was added to the quartz glass reaction tube to form the phosphor bed. Liquid trimethyl aluminum was used in the stainless steel bubbler as the coating precursor material. The carrier gas was bubbled into the trimethyl aluminum liquid to form carrier gas containing vaporized trimethyl aluminum. The carrier gas containing vaporized trimethyl aluminum was transported via the carrier line to the quartz glass reaction tube. Oxygen gas diluted with nitrogen was transported into the fluidized bed through the holes located on the shaft of the vibrating mixer. The vibrating mixer was operated at a speed at 60 cycles/minute.

The bubbler and the nitrogen gas line leading into the bubbler were both heated to and maintained at a temperature of 30° C. The line leading out of the bubbler and into the bottom of the quartz glass reaction tube was heated to an maintained at a temperature of about 45° C.

The frit area of the reaction tube was maintained at a temperature of from about 60° C. to about 150° C.; the oxidizing gas inlet area, located above the vibrating disc, was heated to and maintained at a temperature of about 400° C.; and the area above the oxidizing gas inlet area was heated to and maintained at a temperature of about 550° C.

A nitrogen flow of about 100 cc/min was passed into the bubbler, and the nitrogen gas containing vaporized trimethyl aluminum was transported by nitrogen carrier gas into the reaction tube at a flow rate of about 550 cc/min. The stream of oxygen gas diluted with nitrogen gas was passed into the reaction tube through the second carrier line. The flow rate of oxygen was about 495 cc/min and that of the nitrogen diluent was about 50 cc/min. A concentration ratio of $O_2$ to trimethyl aluminum of about 200 to 1 was maintained during this reaction to obtain a white body color.

The process was continued for 9 hours and an aluminum oxide coating having a thickness of about 150 Angstroms was formed on the phosphor particles.

Electron microscopy of the coated phosphor particles of this example indicated a smooth conformal coating of aluminum oxide on the cool white alkaline earth halophosphate phosphor particles. The continuous and conformal nature of the coating applied to the phosphor particle in the example was demonstrated by the replication of the submicron features of the phosphor substrate. The submicron features of the coated particle, however, are visibly less pronounced when compared to the submicron features of an uncoated particle.

EXAMPLE V

In this example, particles of cool white alkaline earth halophosphate phosphor powder were coated with aluminum oxide by the method of the present invention, using the apparatus described in Example I. Three hundred grams of calcium halophosphate phosphor powder (Cool White No. 4459, obtained from the Chemical and Metallurgical Division of GTE Products Corporation, Towanda, Pa.) and 0.15 g (0.05 weight percent) Aluminum Oxide C, available from Degussa, Inc., the fluidizing aid, were dry blended in a polyethylene jar to obtain a uniform dispersion of the Aluminum Oxide C fluidizing aid throughout the alkaline earth halophosphate powder. The mixture of the halophosphate phosphor powder and fluidizing aid was added to the quartz glass reaction tube to form the phosphor bed. Liquid trimethyl aluminum was used in the stainless steel bubbler as the coating precursor material. The carrier gas was bubbled into the trimethyl aluminum liquid to form carrier gas containing vaporized trimethyl aluminum. The carrier gas containing vaporized trimethyl aluminum was transported via the carrier line to the quartz glass reaction tube. Oxygen gas diluted with nitrogen was transported into the fluidized bed through the holes located on the shaft of the vibrating mixer. The vibrating mixer was operated at a speed at 60 cycles/minute.

The bubbler and the nitrogen gas line leading into the bubbler were both heated to and maintained at a temperature of 30° C. The line leading out of the bubbler and into the bottom of the quartz glass reaction tube was heated to an maintained at a temperature of about 45° C.

The frit area of the reaction tube was maintained at a temperature of from about 60° C. to about 150° C.; the oxidizing gas inlet area, located above the vibrating disc, was heated to and maintained at a temperature of about 400° C.; and the area above the oxidizing gas inlet area was heated to and maintained at a temperature of about 550° C.

A nitrogen flow of about 150 cc/min was passed into the bubbler, and the nitrogen gas containing vaporized trimethyl aluminum was transported by nitrogen carrier gas into the reaction tube at a flow rate of about 550 cc/min. The stream of oxygen gas diluted with nitrogen gas was passed into the reaction tube through the second carrier line. The flow rate of oxygen was about 495 cc/min and that of the nitrogen diluent was about 50 cc/min. A concentration ratio of $O_2$ to trimethyl aluminum of about 200 to 1 was maintained during this reaction to obtain a white body color.

The process was continued for 9 hours and an aluminum oxide coating having a thickness of about 150 Angstroms was formed on the phosphor particles.

Electron microscopy of the coated phosphor particles of this example indicated a smooth conformal coating of aluminum oxide on the cool white alkaline earth halophosphate phosphor particles. The continuous and conformal nature of the coating applied to the phosphor particle in the example was demonstrated by the replication of the submicron features of the phosphor substrate. The submicron features of the coated particle, however, are visibly less pronounced when compared to the submicron features of an uncoated particle.

EXAMPLE VI

In this example, particles of cool white alkaline earth halophosphate phosphor powder were coated with aluminum oxide by the method of the present invention, using the apparatus described in Example I. Three hundred grams of calcium halophosphate phosphor powder (Cool White No. 4459, obtained from the Chemical and Metallurgical Division of GTE Products Corporation, Towanda, Pa.) and 0.15 g (0.05 weight percent) Aluminum Oxide C, available from Degussa, Inc., the fluidizing aid, were dry blended in a polyethylene jar to obtain a uniform dispersion of the Aluminum Oxide C fluidizing aid throughout the alkaline earth halophosphate powder. The mixture of the halophosphate phosphor powder and fluidizing aid was added to the quartz glass reaction tube to form the phosphor bed. Liquid trimethyl aluminum was used in the stainless steel bubbler as the coating precursor material. The carrier gas was bubbled into the trimethyl aluminum liquid to form carrier gas containing vaporized trimethyl aluminum. The carrier gas containing vaporized trimethyl aluminum was transported via the carrier line to the quartz glass reaction tube. Oxygen gas diluted with nitrogen was transported into the fluidized bed through the holes located on the shaft of the vibrating mixer. The vibrating mixer was operated at a speed at 60 cycles/minute.

The bubbler and the nitrogen gas line leading into the bubbler were both heated to and maintained at a temperature of 30° C. The line leading out of the bubbler and into the bottom of the quartz glass reaction tube was heated to an maintained at a temperature of about 45° C.

The frit area of the reaction tube was maintained at a temperature of from about 60° C. to about 150° C.; the oxidizing gas inlet area, located above the vibrating disc, was heated to and maintained at a temperature of about 400° C.; and the area above the oxidizing gas inlet area was heated to and maintained at a temperature of about 550° C.

A nitrogen flow of about 150 cc/min was passed into the bubbler, and the nitrogen gas containing vaporized trimethyl aluminum was transported by nitrogen carrier gas into the reaction tube at a flow rate of about 500 cc/min. The stream of oxygen gas diluted with nitrogen gas was passed into the reaction tube through the second carrier line. The flow rate of oxygen was about 495 cc/min and that of the nitrogen diluent was about 50 cc/min. A concentration ratio of $O_2$ to trimethyl aluminum of about 200 to 1 was maintained during this reaction to obtain a white body color.

The process was continued for 8 hours and an aluminum oxide coating having a thickness of about 200 Angstroms was formed on the phosphor particles.

Electron microscopy of the coated phosphor particles of this example indicated a smooth conformal coating of aluminum oxide on the cool white alkaline earth halophosphate phosphor particles. The continuous and conformal nature of the coating applied to the phosphor particle in the example was demonstrated by the replication of the submicron features of the phosphor substrate. The submicron features of the coated particle, however, are visibly less pronounced when compared to the submicron features of an uncoated particle.

EXAMPLE VII

In this example, particles of cool white alkaline earth halophosphate phosphor powder were coated with aluminum oxide by the method of the present invention, using the apparatus described in Example I. Three hundred grams of calcium halophosphate phosphor powder (Cool White No. 4459, obtained from the Chemical and Metallurgical Division of GTE Products Corporation, Towanda, Pa.) and 0.15 g (0.05 weight percent) Aluminum Oxide C, available from Degussa, Inc., the fluidizing aid, were dry blended in a polyethylene jar to obtain a uniform dispersion of the Aluminum Oxide C fluidizing aid throughout the alkaline earth halophosphate powder. The mixture of the halophosphate phosphor powder and fluidizing aid was added to the quartz glass reaction tube to form the phosphor bed. Liquid trimethyl aluminum was used in the stainless steel bubbler as the coating precursor material. The carrier gas was bubbled into the trimethyl aluminum liquid to form carrier gas containing vaporized trimethyl aluminum. The carrier gas containing vaporized trimethyl aluminum was transported via the carrier line to the quartz glass reaction tube. Oxygen gas diluted with nitrogen was transported into the fluidized bed through the holes located on the shaft of the vibrating mixer. The vibrating mixer was operated at a speed at 60 cycles/minute.

The bubbler and the nitrogen gas line leading into the bubbler were both heated to and maintained at a temperature of 30° C. The line leading out of the bubbler and into the bottom of the quartz glass reaction tube was heated to an maintained at a temperature of about 45° C.

The frit area of the reaction tube was maintained at a temperature of from about 60° C. to about 150° C.; the oxidizing gas inlet area, located above the vibrating disc, was heated to and maintained at a temperature of about 400° C.; and the area above the oxidizing gas inlet area was heated to and maintained at a temperature of about 550° C.

A nitrogen flow of about 150 cc/min was passed into the bubbler, and the nitrogen gas containing vaporized trimethyl aluminum was transported by nitrogen carrier gas into the reaction tube at a flow rate of about 500 cc/min. The stream of oxygen gas diluted with nitrogen gas was passed into the reaction tube through the second carrier line. The flow rate of oxygen was about 495 cc/min and that of the nitrogen diluent was about 50 cc/min. A concentration ratio of $O_2$ to trimethyl aluminum of about 200 to 1 was maintained during this reaction to obtain a white body color.

The process was continued for 12 hours and an aluminum oxide coating having a thickness of about 300 Angstroms was formed on the phosphor particles.

Electron microscopy of the coated phosphor particles of this example indicated a smooth conformal coating of aluminum oxide on the cool white alkaline earth halophosphate phosphor particles. The continuous and conformal nature of the coating applied to the phosphor particle in the example was demonstrated by the replication of the submicron features of the phosphor substrate. The submicron features of the coated particle, however, are visibly less pronounced when compared to the submicron features of an uncoated particle.

EXAMPLE VIII

In this example, particles of cool white alkaline earth halophosphate phosphor powder were coated with aluminum oxide by the method of the present invention, using the apparatus described in Example I. Three hundred grams of calcium halophosphate phosphor powder (Cool White No. 4459, obtained from the Chemical and Metallurgical Division of GTE Products Corporation, Towanda, Pa.) and 0.15 g (0.05 weight percent) Aluminum Oxide C, available from Degussa, Inc., the fluidizing aid, were dry blended in a polyethylene jar to obtain a uniform dispersion of the Aluminum Oxide C fluidizing aid throughout the alkaline earth halophosphate powder. The mixture of the halophosphate phosphor powder and fluidizing aid was added to the quartz glass reaction tube to form the phosphor bed. Liquid trimethyl aluminum was used in the stainless steel bubbler as the coating precursor material. The carrier gas was bubbled into the trimethyl aluminum liquid to form carrier gas containing vaporized trimethyl aluminum. The carrier gas containing vaporized trimethyl aluminum was transported via the carrier line to the quartz glass reaction tube. Oxygen gas diluted with nitrogen was transported into the fluidized bed through the holes located on the shaft of the vibrating mixer. The vibrating mixer was operated at a speed at 60 cycles/minute.

The bubbler and the nitrogen gas line leading into the bubbler were both heated to and maintained at a temperature of 30° C. The line leading out of the bubbler and into the bottom of the quartz glass reaction tube was heated to an maintained at a temperature of about 45° C.

The frit area of the reaction tube was maintained at a temperature of from about 60° C. to about 150° C.; the oxidizing gas inlet area, located above the vibrating disc, was heated to and maintained at a temperature of about 400° C.; and the area above the oxidizing gas inlet area was heated to and maintained at a temperature of about 550° C.

A nitrogen flow of about 200 cc/min was passed into the bubbler, and the nitrogen gas containing vaporized trimethyl aluminum was transported by nitrogen carrier gas into the reaction tube at a flow rate of about 450 cc/min. The stream of oxygen gas diluted with nitrogen gas was passed into the reaction tube through the second carrier line. The flow rate of oxygen was about 496 cc/min and that of the nitrogen diluent was about 50 cc/min. A concentration ratio of $O_2$ to trimethyl aluminum of about 200 to 1 was maintained during this reaction to obtain a white body color.

The process was continued for 12 hours and an aluminum oxide coating having a thickness of about 400 Angstroms was formed on the phosphor particles.

Electron microscopy of the coated phosphor particles of this example indicated a smooth conformal coating of aluminum oxide on the cool white alkaline earth halophosphate phosphor particles. The continuous and conformal nature of the coating applied to the phosphor particle in the example was demonstrated by the replication of the submicron features of the phosphor substrate. The submicron features of the coated particle, however, are visibly less pronounced when compared to the submicron features of an uncoated particle.

SEM photomicrographs of uncoated cool white phosphor particles, uncoated cool white phosphor particles which had been mechanically mixed with 0.05 weight percent Aluminum Oxide C, and cool white phosphor particles which had been coated with alumina by the method of the present invention to varying coating thicknesses were compared. The photomicrographs revealed that as the coating thickness is increased above 150 Angstroms, a preferential growth of the alumina coating is visible on those parts of the phosphor particle to which Aluminum Oxide C particles had adhered during the powder preparation. This effect becomes increasingly more visible as the coating thickness increases. Also the surface texture becomes less clearly pronounced with increasing coating thickness under very high resolution (50,000–100,000 X) SEM analysis.

EXAMPLE IX

In this example, particles of cool white alkaline earth halophosphate phosphor powder were coated with aluminum oxide by the method of the present invention, using the apparatus described in Example I. Two hundred grams of calcium halophosphate phosphor powder (Cool White No. 4459, obtained from the Chemical and Metallurgical Division of GTE Products Corporation, Towanda, Pa.) without a fluidizing aid were added to the quartz glass reaction tube to form the phosphor bed. Liquid trimethyl aluminum was used in the stainless steel bubbler as the coating precursor material. The carrier gas was bubbled into the trimethyl aluminum liquid to form carrier gas containing vaporized trimethyl aluminum. The carrier gas containing vaporized trimethyl aluminum was transported via the carrier line to the quartz glass reaction tube. Oxygen gas diluted with nitrogen was transported into the fluidized bed through the holes located on the shaft of the vibrating mixer. The vibrating mixer was operated at a speed at 60 cycles/minute.

The bubbler and the nitrogen gas line leading into the bubbler were both heated to and maintained at a temperature of 30° C. The line leading out of the bubbler into the bottom of the quartz glass reaction tube was heated to and maintained at a temperature of about 45° C.

The frit area of the reaction tube was maintained at a temperature of from about 60° C. to about 150° C.; the oxidizing gas inlet area, located above the vibrating disc, was heated to and maintained at a temperature of about 400° C.; and the area above the oxidizing gas inlet area was heated to and maintained at a temperature of about 550° C.

A nitrogen flow of about 100 cc/min was passed into the bubbler, and the nitrogen gas containing vaporized trimethyl aluminum was transported by nitrogen carrier into the reaction tube at a flow rate of about 450 cc/min. The stream of oxygen gas diluted with nitrogen gas was passed into the reaction tube through a second carrier line. The flow rate of oxygen was about 496 cc/min and that of the nitrogen diluent was about 50 cc/min. A concentration ratio of O₂ to trimethyl aluminum of about 200 to 1 was maintained during this reaction.

The process was continued for 6¼ hours and an aluminum oxide coating having a thickness of about 160 Angstroms was formed on the phosphor particles.

Electron microscopy of the coated phosphor particles of this example indicated a smooth conformal coating of aluminum oxide on the cool white alkaline earth halophosphate phosphor particles. The continuous and conformal nature of the coating applied to the phosphor particle in the example was demonstrated by the replication of the submicron features of the phosphor substrate. The submicron features of the coated particle, however, are visibly less pronounced when compared to the submicron features of an uncoated particle.

Auger analysis of the coated particle surface revealed that complete surface coverage.

It was observed, however, that phosphor particles coated without the use of the fluidizing aid exhibited an off-white body color and reflected a loss in brightness. The poor body color is attributed to the poor circulation of the precursor material through the bed due to less than maximum bed expansion in the absence of the fluidizing aid.

The coating thicknesses reported in each of the preceding examples is calculated using the following equation:

$$t_{coating}/\text{hour} = \frac{\text{grams Al}_2\text{O}_3/\text{hour}}{3.97 \text{ g Al}_2\text{O}_3/\text{cc} \times \text{Surface area of phosphor} \times \text{total bed loading (g)}}$$

While there has been shown and described what at present are considered preferred embodiments of the invention, it will be obvious to those skilled in the art that various changes and modifications may be made therein without departing from the scope of the invention as defined by the appended claims.

What is claimed is:

1. A method for forming a protective coating on phosphor particles comprising:
   (a) fluidizing particles of a phosphor powder in a fluidized bed;
   (b) exposing the fluidized particles to a vaporized coating precursor at a first temperature to envelop the particles with coating precursor material, said first temperature being less than the temperature at which the coating precursor material decomposes; and
   (c) reacting the coating precursor material enveloping the fluidized particles at a second temperature to form a continuous protective coating of predetermined thickness on the surface of individual phosphor particles, said second temperature being greater than or equal to the temperature at which the coating precursor material reacts to form the protective coating.

2. A method in accordance with claim 1 wherein the phosphor powder is a fine phosphor powder, said method further comprising:
   agitating particles in the fluidized bed with agitating means while said particles are fluidized.

3. A method in accordance with claim 1 wherein the phosphor powder comprises a uniform mixture of a fine phosphor powder and up to about 1 weight percent fluidizing aid.

4. A method in accordance with claim 2 wherein the protective coating is a refractory oxide.

5. A method in accordance with claim 3 wherein the protective coating is a refractory oxide.

6. A method for forming a protective coating on phosphor particles comprising:
   (a) vaporizing a volatilizable coating precursor material into an inert carrier gas to form a carrier gas containing vaporized coating precursor material;
   (b) passing said carrier gas containing the vaporized coating precursor material through particulate phosphor powder to form a fluidized bed and to envelop particles of the phosphor powder with vapor of the coating precursor material contained in the carrier gas, said fluidized bed being maintained in a temperature gradient ranging from a lowest temperature to a highest temperature, said lowest temperature being less than the temperature at which said coating precursor material decomposes and said highest temperature being equal to or greater than the temperature at which the coating precursor material reacts with an oxidizing gas to form a desired coating material;
   (c) passing oxidizing gas into said fluidized bed separately from said carrier gas containing the vaporized coating precursor material and reacting said oxidizing gas with vapor of the coating precursor material on the particles of phosphor powder to form a continuous coating of predetermined thickness on the phosphor particles.

7. A method in accordance with claim 6 wherein said inert carrier gas is selected from the group consisting of nitrogen, argon, helium, neon, and mixtures thereof.

8. A method in accordance with claim 6 wherein said oxidizing gas is diluted with an inert gas.

9. A method in accordance with claim 6 wherein said protective coating material is a refractory oxide.

10. A method for forming a protective coating on phosphor particles comprising:
    (a) vaporizing a volatilizable oxygen-containing coating precursor material into an inert carrier gas to form a carrier gas containing vaporized oxygen-containing coating precursor material;
    (b) passing said carrier gas containing the vaporized oxygen-containing coating precursor material through particulate phosphor powder to form a fluidized bed and to envelop particles of the phosphor powder with vapor of the oxygen-containing coating precursor material contained in the carrier gas, said fluidized bed being maintained in a temperature gradient ranging from a lowest temperature to a highest temperature, said lowest temperature being less than the temperature at which said oxygen-containing coating precursor material decomposes and said highest temperature being equal to or greater than the temperature at which the oxygen-containing coating precursor material reacts to form a continuous coating of predetermined thickness on the phosphor particles.

11. A method in accordance with claim 10 wherein the protective coating material is a refractory oxide.

12. A method for forming a continuous coating on phosphor particles of a fine phosphor powder comprising:

(a) vaporizing a volatilizable coating precursor material into an inert carrier gas to form a carrier gas containing vaporized coating precursor material;

(b) passing said carrier gas containing the vaporized coating precursor material through a mixture of a fine phosphor powder and up to about 1 weight percent of a fluidizing aid to form a fluidized bed in which the particles are suspended in the carrier gas and to envelop the fluidized particles with vapor of the coating precursor material contained in the carrier gas, said fluidized bed being maintained in a temperature gradient ranging from a lowest temperature to a highest temperature, said lowest temperature being less than the temperature at which said coating precursor material decomposes and said highest temperature being equal to or greater than the temperature at which the coating precursor material reacts with an oxidizing gas to form a desired coating material;

(c) passing oxidizing gas into said fluidized bed separately from said carrier gas containing the vaporized coating precursor material and reacting said oxidizing gas with the vapor of the coating precursor material on the particles of phosphor powder to form a continuous coating of predetermined thickness on the phosphor particle.

13. A method in accordance with claim 12 further comprising the step of
agitating particles in the fluidized bed while said particles are suspended in the fluidized bed by the carrier gas.

14. A method in accordance with claim 13 wherein said fluidizing aid is selected from the group consisting of small particle alumina and small particle silica.

15. A method in accordance with claim 13 wherein said inert carrier gas is selected from the group consisting of nitrogen, argon, helium, neon, and mixtures thereof.

16. A method in accordance with claim 13 wherein said oxidizing gas is diluted with an inert gas.

17. A method in accordance with claim 13 wherein said coating precursor material is a volatilizable organometallic compound.

18. A method in accordance with claim 13 wherein said coating precursor material is a volatizable metal-acetylacetonate.

19. A method in accordance with claim 13 wherein said coating precursor material is a volatilizable metal alkoxide compound.

20. A method for forming a protective coating on particles of a fine phosphor powder comprising:
(a) vaporizing a volatilizable coating precursor material into an inert carrier gas to form a carrier gas containing vaporized coating precursor material;

(b) passing said carrier gas containing the vaporized coating precursor material through a fine particulate phosphor powder to form a fluidized bed and to envelop particles of the fine phosphor powder with vapor of the coating precursor material contained in the carrier gas, said fluidized bed being maintained in a temperature gradient ranging from a lowest temperature to a highest temperature, said lowest temperature being less than the temperature at which said coating precursor material decomposes and said highest temperature being equal to or greater than the temperature at which the coating precursor material reacts with an oxidizing gas to form a desired coating material;

(c) agitating particles with agitating means in the fluidized bed while said particles are suspended in the fluidized bed by the carrier gas; and (d) passing oxidizing gas into said fluidized bed separately from said carrier gas containing the vaporized coating precursor material and reacting said oxidizing gas with vapor of the coating precursor material on the particles of the fine phosphor powder to form a continuous coating of predetermined thickness on the phosphor particles.

21. A method in accordance with claim 20 wherein the protective coating is a refractory oxide.

22. A method for forming a protective coating on particles of a fine phosphor powder comprising:
(a) vaporizing a volatilizable oxygen-containing coating precursor material into an inert carrier gas to form a carrier gas containing vaporized oxygen-containing coating precursor material;

(b) passing said carrier gas containing the vaporized oxygen-containing coating precursor material through a mixture of a fine particulate phosphor powder and up to about 1 weight percent of a fluidizing aid to form a fluidized bed and to envelop particles of the fine phosphor powder with vapor of the oxygen-containing coating precursor material contained in the carrier gas, said fluidized bed being maintained in a temperature gradient ranging from a lowest temperature to a highest temperature, said lowest temperature being less than the temperature at which said oxygen-containing coating precursor material decomposes and said highest temperature being equal to or greater than the temperature at which the oxygen-containing coating precursor material reacts to form a continuous coating of predetermined thickness on the phosphor particles.

23. A method in accordance with claim 22 further comprising the step of
agitating particles in the fluidized bed with agitating means while said particles are suspended in the fluidized bed by the carrier gas.

24. A method in accordance with claim 22 wherein the protective coating is a refractory oxide.

25. A method for forming a protective coating on particles of a fine phosphor powder comprising:
(a) vaporizing a volatilizable oxygen-containing coating precursor material into an inert carrier gas to form a carrier gas containing vaporized oxygen-containing coating precursor material;

(b) passing said carrier gas containing the vaporized oxygen-containing coating precursor material through a fine particulate phosphor powder to form a fluidized bed and to envelop particles of the fine phosphor powder with vapor of the oxygen-containing coating precursor material contained in the carrier gas, said fluidized bed being maintained in a temperature gradient ranging from a lowest temperature to a highest temperature, said lowest temperature being less than the temperature at which said oxygen-containing coating precursor material decomposes and said highest temperature being equal to or greater than the temperature at which the oxygen-containing coating precursor material reacts to form a continuous coating of predetermined thickness on the phosphor particles; and (c) agitating particles with agitating means in the fluidized bed while said particles are suspended in the fluidized bed by the carrier gas.

26. A method in accordance with claim 25 wherein the protective coating is a refractory oxide.

27. A method for forming a continuous aluminum oxide coating upon particles of a cool white alkaline earth halophosphate phosphor comprising:
(a) vaporizing trimethyl aluminum into an inert carrier gas consisting of nitrogen to form a carrier gas containing vaporized trimethyl aluminum;
(b) passing said carrier gas containing vaporized trimethyl aluminum through a mixture of cool white alkaline earth halophosphate phosphor powder and up to about 1 weight percent small particle alumina to form a fluidized bed in which the particles are suspended in the carrier gas and to envelop particles of the phosphor powder with vapor of the trimethyl aluminum contained in the carrier gas, said fluidized bed being maintained in a temperature gradient ranging from a lowest temperature to a highest temperature, said lowest temperature being from about 60° C. to about 150° C. and said highest temperature being from about 450° C. to about 650° C.;
(c) agitating particles of the phosphor while said particles are suspended in the fluidized bed by the carrier gas;
(d) passing oxidizing gas consisting essentially of oxygen into said fluidized bed separately from said carrier gas containing vaporized trimethyl aluminum and reacting said oxygen with the trimethyl aluminum vapor on the calcium halophosphate particles to form a continuous aluminum oxide coating of predetermined thickness on the phosphor particles.

28. A method in accordance with claim 27 wherein steps (a) through (d) are continued for a period of time sufficient to form a continuous aluminum oxide coating having a thickness greater than or equal to about 100 Angstroms on the phosphor particles.

* * * * *